UNITED STATES PATENT OFFICE.

JOHN CARNRICK, OF NEW YORK, N. Y.

KUMISS COMPOUND.

SPECIFICATION forming part of Letters Patent No. 611,234, dated September 27, 1898.

Application filed October 5, 1891. Renewed February 23, 1898. Serial No. 671,328. (No specimens.) Patented in England December 7, 1891, No. 21,372.

*To all whom it may concern:*

Be it known that I, JOHN CARNRICK, a citizen of the United States, residing at New York city, in the county of New York and State of New York, have invented certain new and useful Improvements in Kumiss Compounds, (for which I have obtained a British patent, No. 21,372, dated December 7, 1891;) and I do hereby declare the following to be a full, clear, and exact description of the invention, such as will enable others skilled in the art to which it appertains to make and use the same.

This invention relates to a concentrated, preferably dry, kumiss compound adapted for the quick and convenient preparation of the effervescent liquid beverage known as "kumiss."

The object of the invention is to provide a uniform and stable kumiss compound containing all the nutritive and medicinal constituents in proper proportions of the best kumiss and adapted (by its dry condition) to be kept any desired length of time and conveniently transported without undergoing a continued fermentation or other deteriorating change.

Another object is to provide a concentrated kumiss compound containing peptonized milk and capable of being quickly converted into a nutritious, easily-digested, and assimilable effervescent food beverage, containing a much larger proportion of soluble casein than is contained in ordinary kumiss and possessing all the valuable therapeutic and food qualities of kumiss as ordinarily prepared.

Kumiss as ordinarily prepared is difficult and expensive to handle and transport in consequence of loss from breakage of the bottles and on account of its becoming spoiled in a short time and unfit for use. It cannot be kept even for a few days in proper condition without being packed in ice. Patients complain that the kumiss is never alike, being one day mildly acid, the next day very acid, and the third day very much like vinegar, and thus frequently unfit for use. By my invention these difficulties are overcome and a concentrated, uniform, and stable kumiss compound is presented which possesses good keeping qualities and can be conveniently used by the patient or other person while traveling on the cars or steamers or while in the country away from the usual sources of bottled kumiss. By the use of my dry kumiss compound the degree of acidity and the percentage of alcohol and carbonic acid developed in the prepared beverage can be perfectly regulated at will and a nutritious beverage of uniform quality readily obtained.

My concentrated dry kumiss is prepared as follows: A suitable quantity of sweet milk is first taken and most of its fat removed in any well-known manner, after which it is placed in a digesting-pan and heated to about 125° Fahrenheit and subjected to the action of a digestive ferment, preferably pancreatin, during gentle stirring or agitation for about one-half hour, or until thirty per cent. of the casein is digested and rendered soluble, while the remaining casein is changed to a non-coagulable and easily-digestible condition. After the desired percentage of casein has been digested the peptonized milk is then sterilized by heating to a temperature of from 190° to 220° Fahrenheit and sufficiently high to destroy the digestive power of pancreatin. While the partially digested or peptonized milk is still hot it is transferred to a vacuum-pan, where there is added to it a sufficient quantity of cocoa-butter to largely replace the natural milk-fat which has been previously removed. There is also added milk-sugar and cane-sugar in such quantities that the proportion of the former shall equal about twenty per cent. and the latter about ten per cent. of the finished dry product, and the batch is then evaporated to a dry condition. The dried milk after removal from the vacuum-pan is ground to a fine powder and is then ready for mixture with other ingredients to form my kumiss compound, as follows: To the powdered peptonized milk containing the added milk-sugar and cane-sugar, as described, I add bicarbonate of soda and citric acid sufficient to render it effervescent, and also lactic acid and a small percentage of a suitable ferment to produce a further fermentation when desired.

Though I preferably use bicarbonate of soda, my invention is not confined thereto, and I propose to use any suitable alkaline carbonate, and instead of citric acid I may use some other suitable acid.

A suitable proportion of ingredients for making my kumiss compound is as follows: dry milk-powder, one hundred pounds; sugar, six pounds; bicarbonate of soda, six pounds, and citric acid, eight pounds.

When ready to be used for the preparation of the kumiss beverage, about one ounce and a half of my dry kumiss compound is added to twelve (12) ounces of water in a bottle, the liquid rising within about an inch of the top, after which the bottle is tightly stoppered and laid on its side. The bottle should be shaken occasionally until the compound has dissolved, and at about the end of twenty minutes it may be put on ice or in a refrigerator and cooled to the desired temperature. The liquid kumiss thus prepared is free from curds or lumps, is white and opaque, and when opened effervesces freely, forming an agreeable nutritious food beverage adapted for the use of invalids and convalescents and other persons for whom a healthful, nutritious, and quickly-assimilated food is required.

In case a larger amount of alcohol, lactic acid, and carbonic acid is desired than can be obtained by simply dissolving the kumiss compound in the stoppered bottle for about a half-hour, as described above, this bottled kumiss must be kept at about the ordinary house temperature for from two to four days, when a further fermentation will develop an increased amount of alcohol, lactic acid, and carbonic acid, and will also increase the solubility and digestibility of the casein.

The dry kumiss compound may be put up for the trade in powdered or granulated form.

The ingredients and proportions herein mentioned may be varied without departing from my invention. The tablets are designed to produce, when dissolved in water, a superior kumiss beverage. The essential claim which I make is a product to take the place of ordinary kumiss.

Having described my invention, what I claim, and desire to secure by Letters Patent, is—

1. As an article of manufacture a concentrated, dry, artificial kumiss compound, containing peptonized milk and adapted, upon the addition of water, to form a nutritious, easily-digested, and assimilable effervescent food beverage.

2. As an article of manufacture a concentrated, dry artificial kumiss compound, containing partially-digested milk and soluble casein and adapted, upon the addition of water, to form a nutritious, easily-digested and assimilable effervescent food beverage.

3. An artificial kumiss compound in dry form containing powdered milk, sugar, an alkaline carbonate, as carbonate of soda, and a suitable acid, and adapted, upon the addition of water, to form an effervescent food beverage.

4. An artificial kumiss compound in dry powdered form containing partially digested or peptonized milk, sugar, an alkaline carbonate, as carbonate of soda and a suitable acid, and adapted, upon the addition of water, to form an effervescent food beverage.

In testimony whereof I affix my signature in presence of two witnesses.

JOHN CARNRICK.

Witnesses:
N. C. PARSHALL,
ALLEN CHAMBERLIN.